(12) United States Patent
Linzy

(10) Patent No.: US 6,718,384 B2
(45) Date of Patent: Apr. 6, 2004

(54) SYSTEM AND METHOD FOR MONITORING AND MAINTAINING A COMMUNICATION NETWORK

(75) Inventor: Richard J. Linzy, Dallas, TX (US)

(73) Assignee: Fujitsu Network Communications, Inc., Richardson, TX (US)

( * ) Notice: Subject to any disclaimer, the term of this patent is extended or adjusted under 35 U.S.C. 154(b) by 30 days.

(21) Appl. No.: 09/925,150

(22) Filed: Aug. 8, 2001

(65) Prior Publication Data

US 2002/0019866 A1 Feb. 14, 2002

Related U.S. Application Data

(60) Provisional application No. 60/223,914, filed on Aug. 9, 2000.

(51) Int. Cl.[7] .............................................. G06F 15/173
(52) U.S. Cl. ................... 709/224; 709/223; 709/220; 714/1; 714/2; 714/25; 714/47; 714/57
(58) Field of Search .................. 709/224, 223, 709/220, 221, 238; 714/1–2, 25, 47, 57

(56) References Cited

U.S. PATENT DOCUMENTS

| | | | | | |
|---|---|---|---|---|---|
| 5,539,907 | A | * | 7/1996 | Srivastava et al. | 717/130 |
| 5,903,886 | A | * | 5/1999 | Heimlich et al. | 706/50 |
| 5,914,966 | A | * | 6/1999 | Bochereau | 714/712 |
| 6,021,117 | A | * | 2/2000 | Juniper et al. | 370/252 |
| 6,377,987 | B1 | * | 4/2002 | Kracht | 709/220 |
| 6,385,201 | B1 | * | 5/2002 | Iwata | 370/400 |
| 6,467,052 | B1 | * | 10/2002 | Kaler et al. | 714/39 |
| 6,487,604 | B1 | * | 11/2002 | Rochford et al. | 709/238 |
| 6,539,427 | B1 | * | 3/2003 | Natarajan et al. | 709/224 |

* cited by examiner

*Primary Examiner*—Frantz B. Jean
(74) *Attorney, Agent, or Firm*—Baker Botts L.L.P.

(57) ABSTRACT

A system and method for monitoring and maintaining a communication network include the capability to determining connection and configuration parameters of network elements. The system and method also include the capability to monitor performance characteristics of network elements to recognize faults within the communication network.

45 Claims, 5 Drawing Sheets

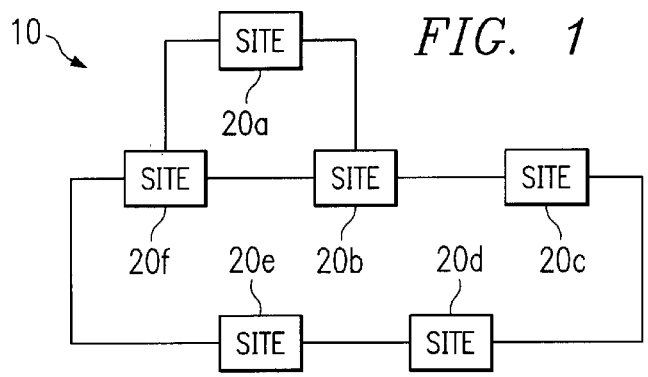
FIG. 1
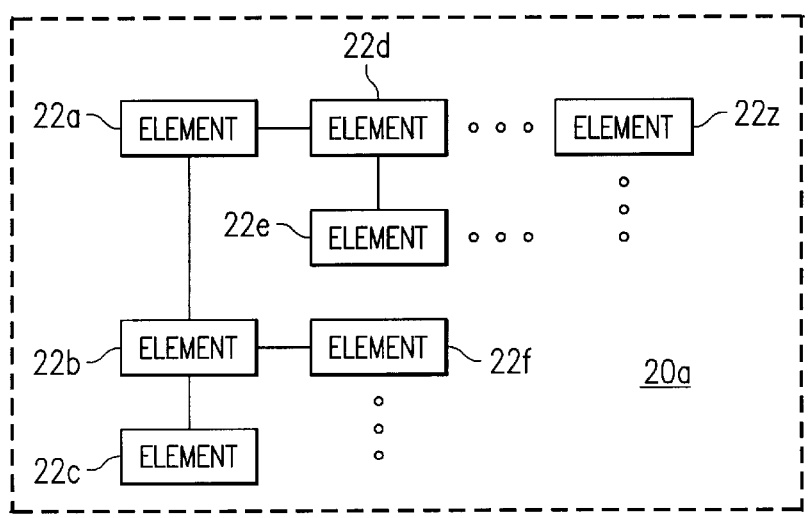
FIG. 2
FIG. 3A
| SIGNAL | BIT RATE (Mbps) | CAPACITY |
|---|---|---|
| STS-1, OC-1 | 51.840 | 28 DS-1s OR 1 DS-3 |
| STS-3, OC-3 | 155.520 | 84 DS-1s OR 3 DS-3s |
| STS-12, OC-12 | 622.080 | 336 DS-1s OR 12 DS-3s |
| STS-48, OC-48 | 2,488.320 | 1,344 DS-1s OR 48 DS-3s |
| STS-192, OC-192 | 9,953.280 | 5,376 DS-1s OR 192 DS-3s |
NOTE:
STS = SYNCHRONOUS TRANSPORT SIGNAL
OC = OPTICAL CARRIER FIG. 3B
| SIGNAL | BIT RATE (Mbps) | CHANNELS |
|---|---|---|
| DS-0 | 0.640 | 1 DS-0 |
| DS-1 | 1.544 | 24 DS-0s |
| DS-2 | 6.312 | 96 DS-0s |
| DS-3 | 44.736 | 28 DS-1s |
FIG. 4
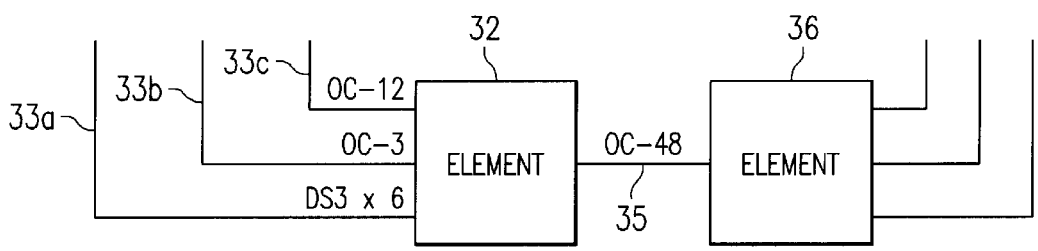
FIG. 5
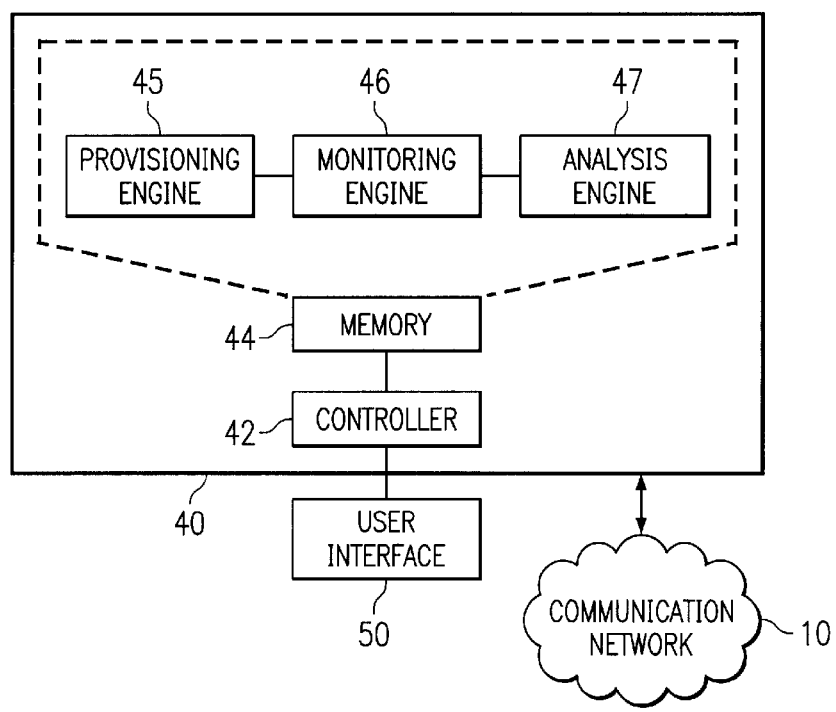

SYSTEM AND METHOD FOR MONITORING AND MAINTAINING A COMMUNICATION NETWORK

RELATED APPLICATIONS

This application claims the benefit under 35 U.S.C. §119 of provisional application Serial No. 60/223,914, filed Aug. 9, 2000.

TECHNICAL FIELD OF THE INVENTION

The present invention relates generally to communication networks and, more particularly, to a system and method for monitoring and maintaining a communication network.

BACKGROUND OF THE INVENTION

Communication networks are commonly used for sending data between different points. To accomplish this, communication networks include many pieces of equipment, such as switch boxes, servers, routers, and others. This equipment needs to be maintained and serviced in order to minimize down time and ensure reliable service.

When a communication network experiences a failure, a number of techniques may be used to correct the problem. For example, a technician may be dispatched to search for the problem. Suspected pieces of equipment will each be tested until the cause of the problem is located. Unfortunately, this process may be time consuming and tedious.

Some communication networks include monitoring facilities. Network elements may be monitored from these points, allowing monitoring remote from the physical location of the network elements. When an alarm is detected, measures are taken to re-route data flow and to solve the problem. For example, the monitoring facility might determine that a certain element is malfunctioning and must be replaced. Remote monitoring facilities help to decrease the amount of time needed to find the cause of a problem.

Unfortunately, prior art remote monitoring systems typically have limited monitoring capabilities. For example, many of these systems are not "intelligent" systems that can learn the topology of the communication network, which may allow greater breadth and accuracy in the subsequent analysis of the network. Moreover, the subsequent analysis of the network requires the analysis of a support engineer, and she may spend a large portion of her time compiling and formatting the provisioning information and only a small portion of their time making their decisions based upon that information. Furthermore, this process may be quite time consuming and result in delays in correcting faults, which can be an intolerable condition in light of today's vast communications.

SUMMARY OF THE INVENTION

The present invention significantly reduces and/or eliminates at least some of the problems with previous monitoring facilities. Accordingly, at least in particular embodiments, the present invention provides a system and method for monitoring and maintaining a communication network.

I certain embodiments, a system for monitoring and maintaining a communication network includes a controller, a memory, a provisioning engine, and a monitoring engine. The memory is coupled to the controller and is operable to store data. The provisioning engine is operable to determine connection and configuration parameters of network elements. The monitoring engine is operable to monitor performance characteristics of network elements and traffic across the optical links between the network elements.

In particular embodiments, a method for monitoring and maintaining a communication network includes determining connection and configuration parameters of network elements. The method also includes monitoring performance characteristics of network elements to recognize faults within the communication network.

The present invention possesses several technical features. For example, in certain embodiments, the invention determines provisioning information for network elements. Thus, when a problem does occur with the communication network, it may be analyzed quicker and in more depth. As another example, in particular embodiments, the invention may compile and format information requested by a user. This frees the user from having to compile and format the information and, accordingly, allows more time for analyzing the communication network. As a further example, in certain embodiments, the invention provides analytical facilities to assist a user in eliminating faults in the communication network. As still a further example, in some embodiments, the invention allows for monitoring of network elements, which is particularly useful during upgrades because it can lower the risk of loss of service. As another example, in certain embodiments, the invention allows a user to graphically view and manipulate the relationships between various network elements. This allows quick comprehension of and changes to the communication network. As still a further example, in particular embodiments, the invention allows remote access to network elements. Thus, a person does not have to travel to a network element to analyze it. Of course, different embodiments of the invention may process none, one, some, or all of the technical advantages and/or additional technical advantages.

Other technical advantages will be readily apparent to those skilled in the art from the following figures, written description, and claims.

BRIEF DESCRIPTION OF THE DRAWINGS

For a more complete understanding of the present invention, especially when considered in light of the following written description, and its technical features, reference is now made to the following drawings, in which:

FIG. 1 illustrates a communication network in accordance with one embodiment of the present invention;

FIG. 2 illustrates one embodiment of a site in the communication network of FIG. 1;

FIGS. 3a and 3b show tables that identify the relationship between digital signal bit rate and optical carrier/synchronous transport signal bit rate and capacity;

FIG. 4 illustrates one embodiment of a communication link and associated provisioning between two network elements that may be monitored and analyzed by the present invention;

FIG. 5 illustrates one embodiment of a system for monitoring and maintaining the communication system of FIG. 1;

DETAILED DESCRIPTION OF THE INVENTION

Figure 6:
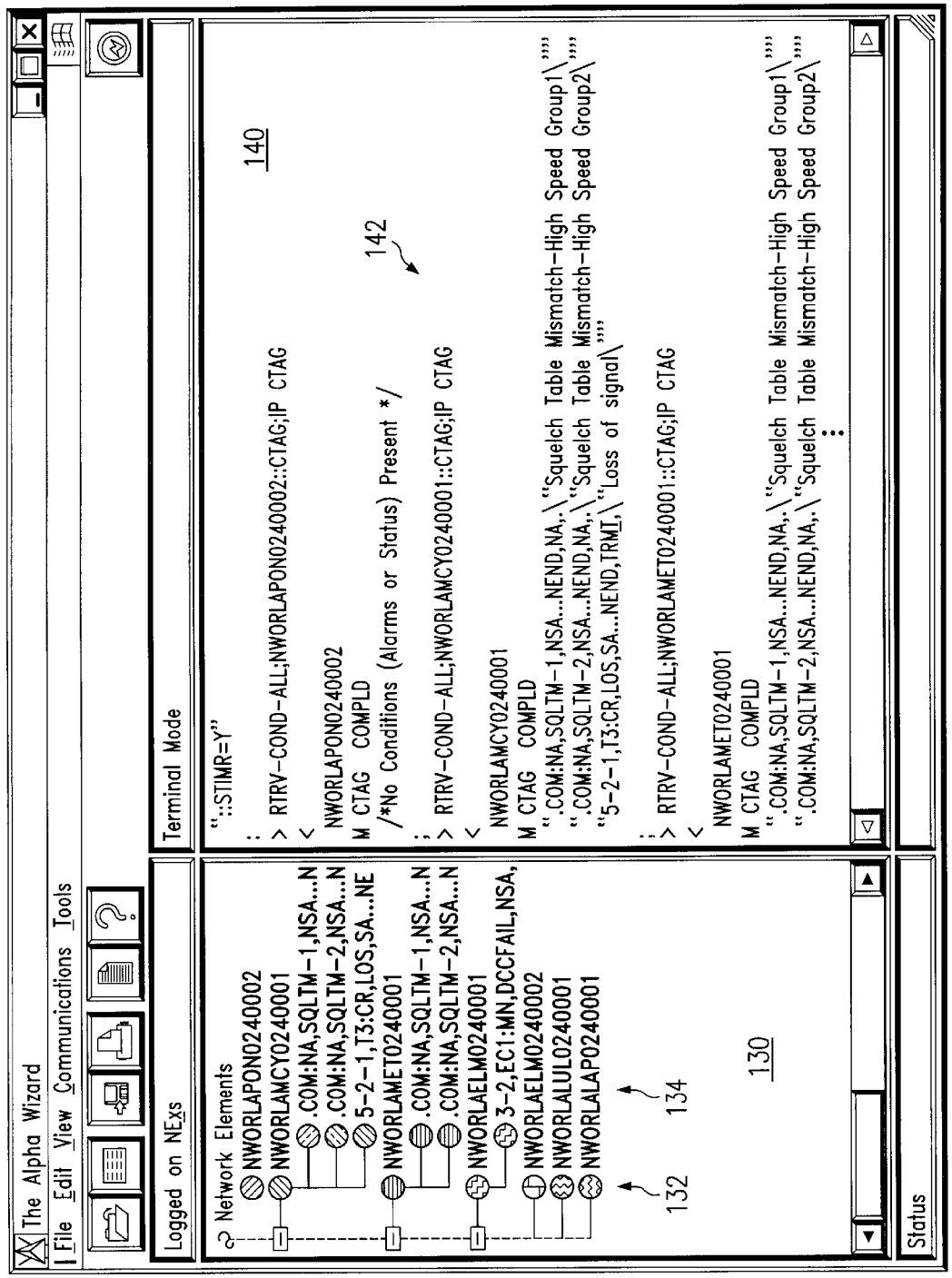
FIG. 6 illustrates one embodiment of a graphical user interface for monitoring a communication network.

The making and using of several embodiments of the invention are discussed in detail below. It should be appreciated, however, that the present invention provides many applicable inventive concepts that can be embodied in a wide variety of specific contexts. Thus, the specific embodiments discussed below are merely illustrative of certain ways to make and use the invention and, hence, do not limit the scope of the invention.

The present invention will be described in a specific context, namely a communications network adhering to Synchronous Optical Network (SONET) standards. However, it will be appreciated by those skilled in the art that the present invention may be applied to any service transport layer product based on a transport layer 1 (TL1), Simple Network Management Protocol (SNMP), such as Plesichoronous Digital Hierarchy (PDH) and Synchronous Digital Hierarchy (SDH), and the like. For an OSI model structure, the present invention may be applied to any service layer.

With reference now to FIG. 1, there is shown a communication network 10 in accordance with one embodiment of the present invention. As illustrated, communication network 10 includes six sites 20 that may be located at various locations. As examples, sites 20 may be within a local area, such as within a metropolitan area, within a state, within a country, or spread around the world. In other words, the present invention applies to a communication network of any size. Sites 20 may exchange data with each other using any appropriate type of wireline or wireless link and any appropriate type of intervening network or component. In a particular embodiment, at least some of sites 20 are connected by fiber-optic cable.

FIG. 2 illustrates one embodiment of site 20a. As illustrated, site 20a includes a number of network elements 22. Network elements 22 may be switches, routers, SONET muxes, regenerators, add/drop multiplexers (ADMs), or any other type of devices used by a communication network. Each of sites 20 may include one or more of network elements 22.

As shown, network elements 22 are coupled together so as to allow the exchange of data with one another as well as with network elements external to site 20a. To accomplish this, network elements 22 are coupled together in a logical fashion, meaning the manner in which connections are viewed from the perspective of communication network 10, and in a physical manner, meaning the way in which they are connected. Determining the logical and physical coupling between the network elements 22 may be important to assessing a communication network, and, thus, a goal of certain embodiments of the invention is to compile information about both the logical and the physical coupling of network elements 22 with each other and with other network elements of communication network 10. Thus, these embodiments of the present invention should understand network protocols and languages.

In the context of a SONET network, SONET defines a technology for carrying many signals of different capacities through a synchronous, flexible, optical hierarchy. This is accomplished by a byte-interleaved multiplexing scheme. The SONET multiplexing scheme involves the generation of the lowest level or base signal, Synchronous Transport Signal-Level 1 (STS-1). STS-1 operates at 51.84 megabits per second (Mbps). Higher-level signals are integer multiples of STS-1, creating the family of STS-N signals as shown in FIGS. 3A and 3B.

The STS-N signals also have an optical counterpart, Optical Carrier Level N. When digital signals are to be transported across an optical link, provisioning must take place. Provisioning defines what and how many signals may be transported across the optical hierarchy with respect to bit rate and capacity.

FIG. 4 illustrates one embodiment of a communication link and associated provisioning between two network elements that may be monitored and analyzed by he present invention. As illustrated, pipe 35 is an OC-48 pipe coupled between network elements 32 and 36. Thus, provisioning must be performed to map out the transport scheme of the various signals between network elements 32 and 36. As an example, according to the fourth row of the table of FIG. 3A, 48 DS-3s or 1,344 DS-1s are capable of being carried over pipe 35. In the illustrated example, the total payload includes one OC-12 signal from pipe 33a, one OC-3 signal from pipe 33b, and six DS-3 signals from pipe 33c. Network element 32 is to combine these signals and send them to network element 36 via pipe 35. Since pipe 35 can carry up to four OC-12 signals, sixteen OC-3 signals, and forty-eight DS-3 signals, twenty-one (12+3+6) out of the forty-eight possible are mapped, leaving twenty-seven that may be carried across pipe 35 to another network element or tributary. One goal of certain embodiments of the present invention is to present this provisioning information or scheme to a user or network tool to effectively monitor and analyze the network for faults.

FIG. 5 illustrates one embodiment of a system 40 for monitoring and maintaining communication network 10. System 40 includes a controller 42 and a memory 44. Controller 42 may be a complex instruction set computer (CISC), a reduced instruction set computer (RISC), a biological computer, an atomic computer, or any other type of device for manipulating information. In a preferred embodiment, controller 42 is a microprocessor such as a Pentium™ or compatible type processor operating a Windows™ or Linux™ operating system. Memory 44 may be random access memory (RAM), read-only memory (ROM), compact disk read-only memory (CD-ROM), registers, and/or any other type of electromagnetic or optical volatile or non-volatile information storage device. System 40 may interface with network elements over a craft interface, over an OSI interface, directly to the OSI protocol stack, by tunneling through X.25, or in any other appropriate manner. Also, system 40 may exchange information with communication network 10 using any suitable link.

As shown in FIG. 5, system 40 also includes a provisioning engine 45, a monitoring engine 46, and an analysis engine 47 implemented in software, which is stored in memory 44 and implemented by controller 42. However, it will be appreciated by those skilled in the art that engines 45, 46, and 47 may be implemented in software, hardware, firmware, or combinations thereof. In fact, FIG. 5 has intentionally been drawn in a very broad and simplified manner to illustrate the point that the invention is not limited to any particular hardware configuration or operating system.

In general, provisioning engine 45 determines performance characteristics for communication network 10. More specifically, provisioning engine 45 may determine connection and transport parameters of optical carriers and their electrically equivalent synchronous transport signals. Provisioning engine 45 may also learn the network topology. Accordingly, provisioning engine 45 is an intelligent tool—one that is capable of learning communication network 10. Provisioning engine 45 may additionally query network elements 22 to validate configuration information, such as, for example, the current firmware on the elements, the card configuration, the connection configurations, and/or the connection management between elements. In particular embodiments, it provides auto-discovery of configuration and connection information for the network elements. Provisioning engine 45 may identify both the aggregate links between network elements 22 and the tributary links between the elements. This provides a very robust tool for analysis of network performance. Thus, the analysis does not just consider conditions of the link between two of elements 22, but may take into account any tributary links to the elements and these links' effect on the performance of the two elements.

In certain embodiments, provisioning engine 45 accomplishes these operations by querying the network elements. Provisioning engine 45 may use TL1 messages, SNMP messages, and/or any other appropriate protocol to query the network elements. The analysis may begin by determining what network elements are present. Provisioning engine 45 may accomplish this by sending a global address response, to which the network elements respond with their address and/or name. For example, the name would be a PID and the address would be a NSAP for an OSI device, and the name would be the device name and the address would be an IP address for an IP device. If provisioning engine 45 detects that a network element is an IP device, it may attempt a Telnet to the device after obtaining a root password. For an OSI device, provisioning engine 45 may require a login and password. Provisioning engine 45 may then log in to the network elements and determine whether the network element use SNMP or TL1 by determining if it receives a proper response to those types of queries. Upon determining the protocol used by a network element, provisioning engine 45 may obtain the information in all of the registers in the network element. For example, provisioning engine 45 may issue a set register all command to reflect the registers and then query the registers. By knowing which protocol the network element uses and which register is reporting, the type of information may be determined. This information may be analyzed in conjunction with pre-stored information libraries about network element types to determine the configuration and connection information for the network element. If a type of device is not recognized, the user may be notified.

Provisioning engine 45 may also determine the parameters as directed by a user, such as a support engineer. The user may enter queries at a user interface 50. User interface 50 may be any combination of user input and output devices, such as a cathode-ray tube display, a liquid crystal display, a keyboard, a mouse, a speaker, and/or any other type of devices for receiving input from a user and providing output to a user. The queries may be in any identifiable language, but generally are plain language inputs. The queries direct provisioning engine 45 to obtain the existing connection parameters between a number of network elements 22 or internal to one network element as needed by the user. Once a query is made, the query is translated into an applicable machine language to facilitate communications downstream between system 40 and network elements 22 of a particular manufacturer. This translation may be provided by a translation engine (not shown).

The applicable machine language is generally a set of pre-defined internal commands programmed into network elements 22 by the manufacturer. When the parameters are sent back upstream to provisioning engine 45, the parameters may be translated back to the identifiable language of the input queries. The information may be formatted into a useful format, such as a MicroSoft™ Excel spreadsheet, for the user. Provisioning engine 45 may be "multi-lingual," in that it may "talk" with the elements of many different manufacturers. Thus, provisioning engine 45 may be used in a communication network having network elements produced by various manufacturers.

In one embodiment, provisioning engine 45 may obtain the connection parameters at the time of the query. In another embodiment, provisioning engine 45 may determine some or all of the parameters, automatically save them in memory 44, and retrieve them upon a query by the user. Provisioning engine 45 may automatically update the parameters periodically for up-to-date reporting of parameters.

Monitoring engine 46 monitors the operations of communication network 10. To accomplish this, monitoring engine 46 may "listen" across communication network 10 for TL1 message retrieval, which may indicate a fault within the system, such as channel down or no signal. Accordingly, monitoring engine 46 may observe the operations actively and unobtrusively. Moreover, monitoring engine 46 may monitor communication network 10 in a real-time format, between about six nanoseconds to about sixty nanoseconds. The timing, however, will depend on the load, traffic, and performance threshold conditions in communication network 10. When monitoring engine 46 detects a TL1 message retrieval, which generally indicates a fault, it may alert a user through audible and/or visual signals. It is also possible for the application to alert a user via a dial-up pager. Generally, the fault is based on communication network 10 hitting some defined threshold condition.

FIG. 6 illustrates one embodiment of a graphical user interface (GUI) 100 for monitoring communication network 10. GUI 100 may be generated by controller 42 or any other suitable device and may be displayed on any suitable device, such as, for example, a cathode-ray tube display or a liquid crystal display. GUI 100 may be character or graphic based. As illustrated, GUI 100 provides a tree-view type alarm monitoring window 130 and a terminal window 140 containing information designed to assist the user in determining the status of the network elements. In the illustrated embodiment, terminal window 140 contains passive TL1 commands (generic retrieves) 142 designed to assist the user in acquiring information about network elements. The TL1 messages may be obtained by "listening" to message traffic on communication network 10 or polling the network elements. In certain embodiments, only monitoring window 130 is displayed, although it may be possible for the user to "click" on a network element's icon to pull up terminal window 140.

Once monitoring engine 46 detects an alarm, it may begin to notify the user through GUI 100. Each alarm is displayed in window 130 as a child of the network element 22 with which it is associated, along with a graphical symbol 134 that reflects the magnitude of the alarm. The network element also has a graphical symbol 132 next to its name that reflects the highest order alarm associated with the network element.

GUI 100 may also contain further features. For example, in certain embodiments, GUT 100 may contain user defined "hot buttons," which may be programmed by a user. Moreover, the buttons may be saved into different groupings. As another example, in particular embodiments, GUI 100 may contain a window that allows a user to interface with the monitored network elements.

Figure 7:
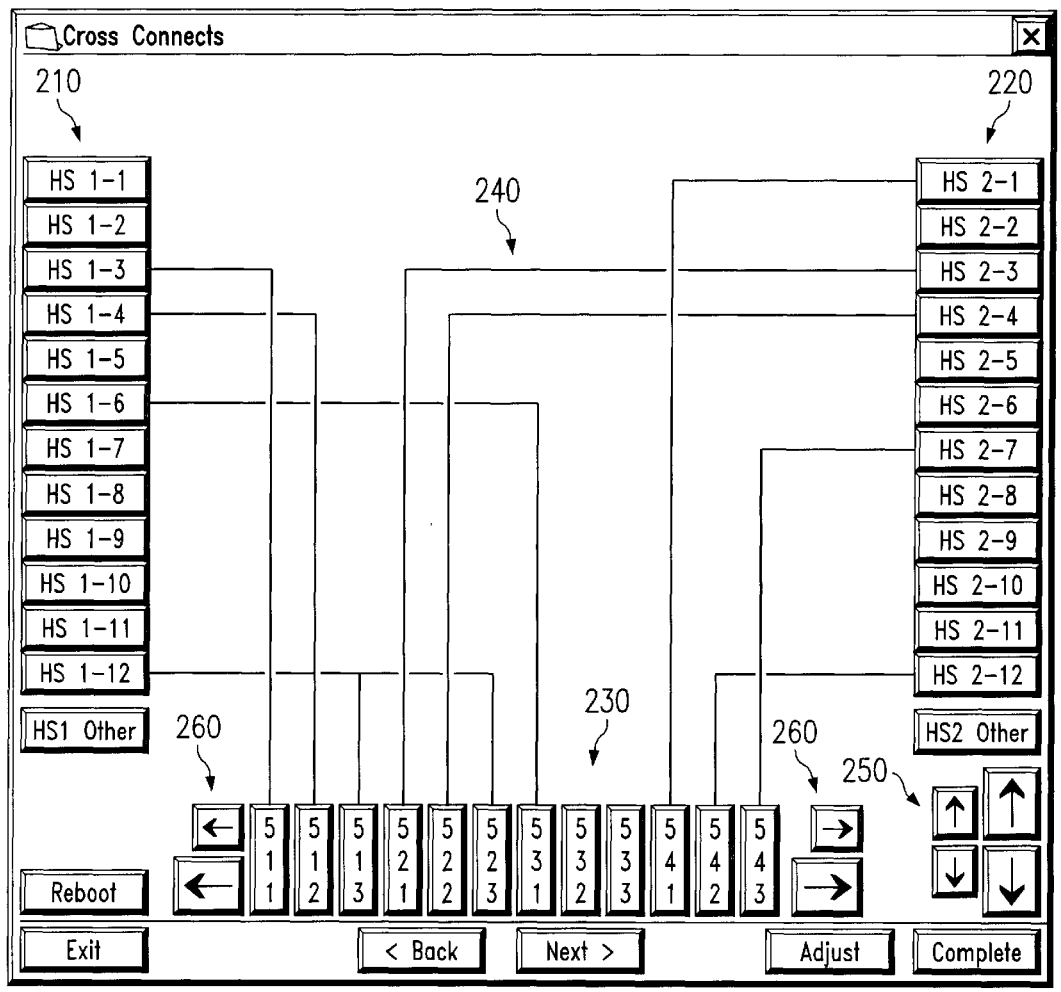
FIG. 7 illustrates one embodiment of another graphical user interface for monitoring a communication network.

FIG. 7 illustrates one embodiment of another graphical user interface (GUI) 200 for monitoring a communication network. GUI 200 allows the user to represent and manipulate add/drop cross connects graphically. In particular, GUI 200 allows the user to manipulate cross connects over multiple nodes, sending the changes only once, and by using efficient means as illustrated in FIG. 7.

As illustrated, blocks 210 represent one group of high speed connections, blocks 220 represent another group of high speed connections, and blocks 230 represent a group of circuit level STS connections. Typically, a network element has E high speed connections, W high speed connections, tributary connections to the high speed connections, and connections from tributaries to the outside world. Lines 240 represent the inter-connections between these elements. Function keys 250 and 260 allow movement between the different inter-connections in the network element. GUI 200 could also represent connections between network elements.

To allow multiple cross connects to be manipulated simultaneously, system 40 analyzed a user command determines the appropriate set of commands from the command set and issues the commands sequentially.

In another embodiment, monitoring engine 46 may be designed to detect a fault based on a locally maintained threshold condition. This is particularly applicable to preventive maintenance applications, where there is a need to be alerted to a condition before it is at the alarm stage. Monitoring engine 46 will thus alert the user to conditions that may graduate into an alarm. In another embodiment, monitoring engine 46 may automatically initiate analysis engine 47.

Analysis engine 47 may retrieve connection parameters and/or performance data for communication network 10. The performance data may reflect the current condition of a network element relative to configuration information, such as, for example, bit error rate. Among the possible areas to query for information are system configuration, required circuit pack process control notifications, current conditions, secure users, circuit provisioning, a graphical cross connect matrix that contains hyperlinks to the corresponding circuit, and a topology diagram. In particular, analysis engine 47 may retrieve performance data for a specific time period as defined by the manufacturer of a network element 22. For instance, a manufacturer might have an eight-hour register in which data is stored. Thus, eight hours of performance data may be retrieved.

In one embodiment, the user may request information collected for a specified time period. After receiving the user request, the analysis engine 47 determines the time length of the register of the specific network element. If, for example, the user requests twenty-four hours of performance data, but the register holds only eight hours of data, analysis engine 47 will query the user if she would like the eight hours of performance data or if she would like three eight hour windows of data. If the latter, the analysis engine would retrieve the performance data at the end of each eight-hour window.

In a particular embodiment, the analysis engine 47 may determine whether circuit packs may go into a mismount condition. The engine may perform this by sending RTRV-MEM commands to the circuit packs and analyze the results. Such an analysis may take approximately two minutes per network element.

Once analysis engine 47 obtains the performance data from each of the applicable network elements, it exports the data into a common reference list and performs extrapolations based on value or based on algorithms. In a particular embodiment, analysis engine 47 produces trending analysis on the performance data. The algorithms may be derived in several ways, including algorithms developed according to customer requirements or network design or algorithms generated based on the manufacturer's defined minimum and/or maximum conditions. Analysis engine 47 may make on-the-fly changes to the threshold conditions upon which the algorithms are based. Just as monitoring engine 46 may monitor the network 10 based on user-defined thresholds, analysis engine 47 utilizes algorithms based on user-defined thresholds. This capability provides a robust design that allows the user to monitor and analyze network 10 as a whole, as opposed to analyzing network 10 based on an individual network element in isolation.

For example, the manufacturer's specification for one of network elements 22 may prescribe a certain threshold burst value. Generally, this threshold value would be used in designing communication network 10 and in monitoring and analysis of the network. However, the design of the network may allow for a higher threshold value based on various factors, including, for example, the bandwidth of the network and how the various types and brands of network elements are integrated. Thus, the higher threshold would determine the fault and alarm levels and derivation of the algorithms for analysis, as opposed to using the listed threshold burst value applicable to the particular network element 22 in isolation.

Analysis engine 47 may also provide performance data through a graphical user interface (GUI). Through the GUI, the user may query analysis engine 47 for and receive any performance data, similar to the user utilizing GUI 100 with monitoring engine 46. In a particular embodiment, analysis engine 47 provides information in the form of a Microsoft™ Excel spreadsheet. Analysis engine 47 removes a significant portion of the work involved in compiling and formatting the information needed. Moreover, the process of returning compiled and formatted information is relatively short and requires little, if any, user intervention or supervision while operating.

In a particular embodiment of the present invention, the network elements may be accessed remotely, such as, for example, by dial-up, Telnet, and/or a remote client server. The connection may provide direct TL1 access to the network elements. The access may even be through a field technician's computer. Remote client access is quite useful in a number of instances. For example, a field engineer may collaborate with a product support engineer on any problems with the communication network 10 by allowing the latter to connect to the network elements as a remote client to see what the field engineer is observing at the site. Moreover, in some instances, the field engineer will utilize remote client access. This not only saves the time of dispatching a field engineer to the site but also reduces the cost of travel and expenses.

The present invention may be used not only with various network topologies and protocols but also with other applications that may be implemented in hardware or software for the network elements. For example, the present invention may be used with a turn-up tool, which is software designed to aid the process of rapid turn-up of connection parameters and characteristics. In one embodiment of the present invention, the Turn-Up Wizard has been ported into the system 40 as a means for collecting the connection parameters for the elements in the network.

Figure 8:
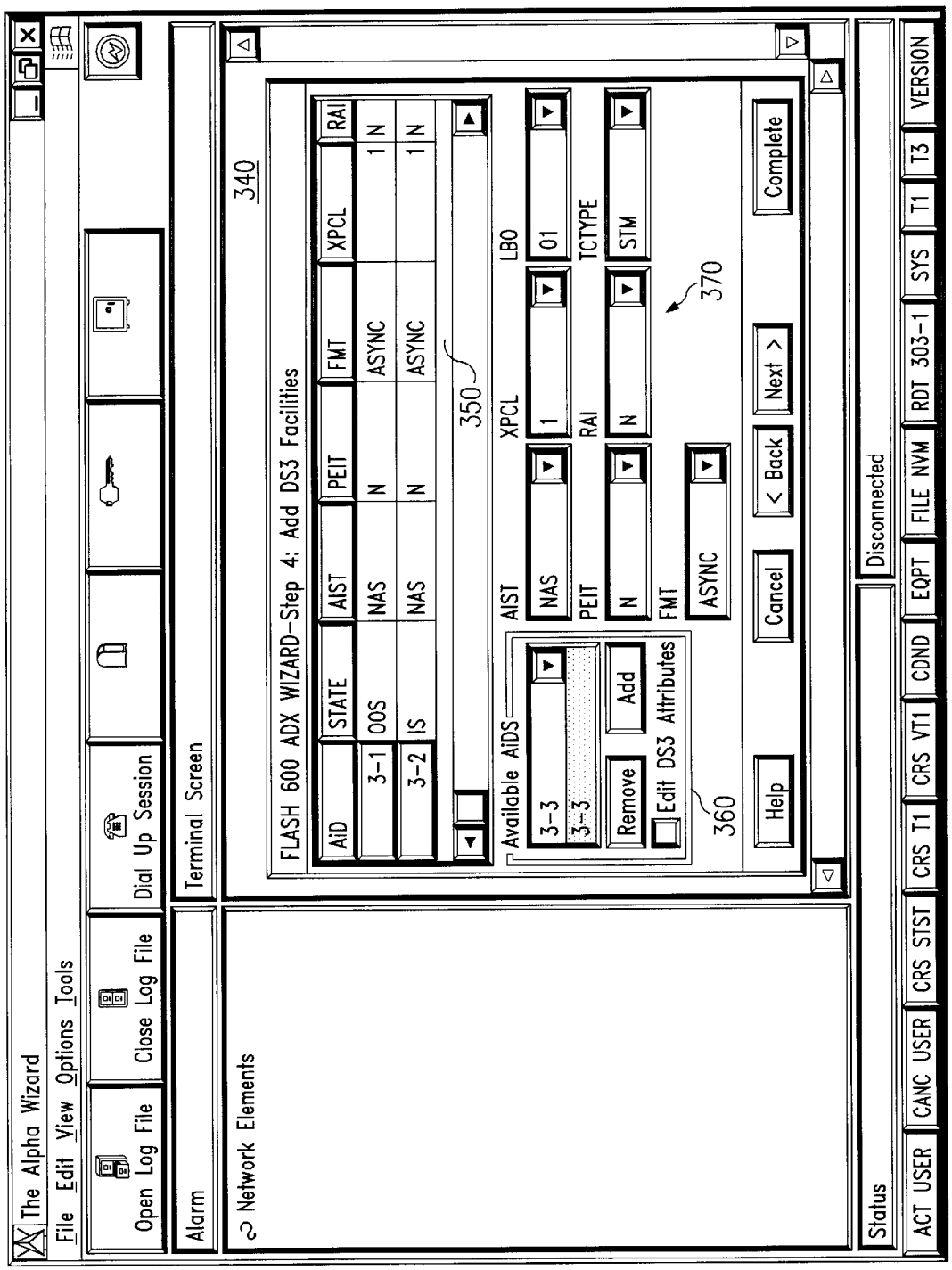
FIG. 8 illustrates one embodiment of a graphical user interface for a turn-up tool.

FIG. 8 illustrates one embodiment of a graphical user interface 300 for a turn-up tool. As shown in FIG. 8, the tool provides a menu format to guide the user through a series of questions. Once the user has completed the battery of questions, the application creates a TL1 script file for the specified configuration and/or connections and will either load that script file onto the target network element or will save it for future use. GUI 300 may also display a previously stored configuration or actual configuration of a network element and allow the user to modify it.

As illustrated, GUI 300 presents a window 340 that contains the configuration and connection information for the network element being provisioned. Section 350 displays the current information regarding connections and allows scrolling through the information. Section 360 allows the selection of connections. Section 370 allows the configuration information to be changed.

In yet another embodiment of the present invention, back-up and restore functionality for one or more network elements that support TL1 is included. This functionality may be accomplished by downloading all system information and creating a TL1 scripting file to create an exact duplicate of the target network element. One of the benefits of this method is that it is independent of software release and therefore is backward compatible. This provides a significant technical advantage over pre-provisioning the nodes and performing a hot-swap on a live system, which is time consuming and risky. Because of the introduction of human error, if any provision information was missed or incorrect, traffic would be affected. This embodiment reduces the time necessary to utilize the back-up and restore functionality from days to hours with small chance of human error. It is possible to dial into the affected network elements using the present invention, create the scripting files, upload that information onto the replacement circuit packs, and ship those to the customer sites for swap out.

Although the present invention and its advantages have been described with respect to several embodiments, a variety of additions, deletions, substitutions, and/or alterations will be readily suggested to those skilled in the art. It is intended, therefore, that the appended claims encompass those additions, deletions, alterations, and/or substitutions.

What is claimed is:

1. A system for monitoring and maintaining a communication network, comprising:
   a controller;
   a memory coupled to the controller, the memory operable to store data;
   a provisioning engine operable to:
      identify a plurality of network elements within the communication network;
      query the network elements within the communication network to determine connection and configuration parameters of the network elements; and
      determine performance characteristics according to the connection and configuration parameters of the network elements; and
   a monitoring engine operable to monitor the communication network by:
      monitoring performance characteristics of the network elements;
      monitoring traffic across optical links between the network elements; and
      detecting messages indicating a possible fault within the communication network.

2. The system of claim 1, further comprising an analysis engine operable to facilitate the avoidance and resolution of undesirable conditions in the communication network.

3. The system of claim 2, wherein the analysis engine performs algorithms based on given threshold values to facilitate the avoidance and resolution of undesirable conditions in the communication network.

4. The system of claim 2, wherein the analysis engine is operable to retrieve connection parameters and performance data for the communication network, the performance data reflecting current conditions of a corresponding one of the network elements relative to corresponding configuration parameters of the network element.

5. The system of claim 1, wherein the system is operable to interface with a communication network adhering to Synchronous Optical Network (SONET) standards.

6. The system of claim 1, wherein the system is integratible to any service transport layer that is based on a translation layer 1 protocol.

7. The system of claim 1, wherein the monitoring engine reports performance conditions relative to given threshold values.

8. The system of claim 7, wherein the given threshold values are user defined.

9. The system of claim 1, further comprising a user interface through which user requests are received and responses to the requests are output.

10. The system of claim 9, further comprising a translation engine for formatting requests received from a user into machine language and responses output to the user from machine language into a language of the user.

11. The system of claim 9, wherein the user interface displays the at least a portion of the responses as a spreadsheet.

12. The system of claim 1, wherein the monitoring engine examines the transmission of data between network elements to determine loading and traffic conditions.

13. The system of claim 1, wherein the monitoring engine reports performance alarms to a user if one or more of the detected messages indicates a possible fault with the communication network.

14. The system of claim 1, wherein the system further includes back-up and restore functionality for the network elements.

15. The system of claim 1, wherein the system facilitates remote client access over a remote server.

16. The system of claim 1, wherein the system is operable to apply changes to cross-connects in a network element simultaneously.

17. The system of claim 1, wherein the messages indicating a possible fault within the communication network comprise transport layer 1 message retrievals.

18. A system for monitoring and maintaining a communication network, comprising:
   a computer-readable medium; and
   computer executable instructions contained in the computer-readable medium for performing the following operations:
      identify a plurality of network elements within the communication network;
      query the network elements within the communication network to determine connection and configuration parameters of the network elements;
      determine performance characteristics according to the connection and configuration parameters of the network elements; and
      monitor the communication network by:
         monitoring performance characteristics of the network elements;
         monitoring traffic across optical links between the network elements; and
         detecting messages indicating a possible fault within the communication network.

19. The system of claim 18, wherein the instructions are further operable to analyze the performance characteristics to facilitate the avoidance and resolution of undesirable conditions in the communication network.

20. The system of claim 19, wherein the instructions are further operable to retrieve connection parameters and performance data for the communication network, the performance data reflecting current conditions of a corresponding one of the network elements relative to corresponding configuration parameters of the network element.

21. The system of claim 18, wherein the connection and configuration parameters comprise system configuration information and circuit provisioning.

22. The system of claim 18, wherein the instructions are further operable to:

obtain data on the performance of the communication network; and format the data in a pre-determined format.

23. The system of claim 18, wherein the monitoring of the performance characteristics of the network elements is performed by computer-readable medium residing in a monitoring engine.

24. The system of claim 18, wherein the instructions are integritible to any service transport layer that is based on a translation layer 1 protocol.

25. The system of claim 18, wherein the instructions are operable to conform to Synchronous Optical Network (SONET) standards.

26. The system of claim 18, wherein the instructions are operable to generate reports regarding performance characterisitics of network elements.

27. The system of claim 26, wherein the reports comprise alarms.

28. The system of claim 18, wherein the messages indicating a possible fault within the communication network comprise transport layer 1 message retrievals.

29. A method for monitoring and maintaining a communication network, comprising:

identifying a plurality of network elements within the communication network;

querying the network elements within the communication network to determine connection and configuration parameters of the network elements;

determining performance characteristics according to the connection and configuration parameters of the network elements; and monitoring the communication network by:

monitoring performance characteristics of the network elements;

monitoring traffic across optical links between the network elements; and detecting messages indicating a possible fault within the communication network.

30. The method claim 29, further comprising analyzing the performance characteristics to facilitate the avoidance and resolution of undesirable conditions in the communication network.

31. The method of claim 30, further comprising retrieving connection parameters and performance data for the communication network, the performance data reflecting current conditions of a corresponding one of the network elements relative to corresponding configuration parameters of the network element.

32. The method of claim 29, further comprising:

obtaining data on the performance of the communication network; and formatting the data in a pre-determined format.

33. The method of claim 29, further comprising generating reports regarding performance conditions of network elements.

34. The method of claim 33, wherein the reports comprise alarms.

35. The system of claim 29, wherein the messages indicating a possible fault within the communication network comprise transport layer 1 message retrievals.

36. A system for monitoring and maintaining a communication network, comprising:

a user interface; and a graphical user interface operable to:

display information regarding the performance characteristics of network elements within the communication network, the performance characteristics of the network elements having been determined by:

identifying a plurality of network elements within the communication network;

querying the network elements within the communication network to determine connection and configuration parameters of the network elements; and determining the performance characteristics according to the connection and configuration parameters of the network elements;

display provisioning information for the network elements; and notify a user of possible faults within the communication network.

37. The system of claim 36, wherein the information regarding the performance characteristics of the network elements comprises alarms.

38. The system of claim 36, wherein the information regarding the performance characteristics of the network elements comprises translation layer 1 messages.

39. The system of claim 36, wherein the provisioning information comprises cross-connects between the network elements.

40. The system of claim 39, wherein the graphical user interface is operable to receive inputs regarding changes to the cross-connects.

41. The system of claim 36, wherein the graphical user interface is operable to receive commands to interface with a network element and to display the results of the those commands.

42. The system of claim 36, wherein the graphical user interface is operable to receive inputs regarding desired information for the network elements and to display the gathered information.

43. The system of claim 42, wherein the desired information is circuit provisioning.

44. The system of claim 36, wherein the graphical user interface is operable to request characteristics of a network element and receive those characteristics.

45. The system of claim 36, wherein the graphical user interface is operable to display characteristics for a network element and receive inputs regarding the characteristics.

* * * * *

UNITED STATES PATENT AND TRADEMARK OFFICE
CERTIFICATE OF CORRECTION

PATENT NO. : 6,718,384 B2
DATED : April 6, 2004
INVENTOR(S) : Linzy

It is certified that error appears in the above-identified patent and that said Letters Patent is hereby corrected as shown below:

Column 1,
Line 61, delete "I", insert -- In --.

Column 4,
Line 6, after "by", delete "he", and insert -- the --.

Column 6,
Line 59, after "embodiments", delete "GUT", and insert -- GUI --.

Column 8,
Line 27, after "interface", delete "GUT", and insert -- GUI --.

Column 10,
Line 27, after "displays", delete "the".

Column 11,
Line 55, after "method", insert -- of --.

Column 12,
Line 49, after "of", delete "the".

Signed and Sealed this

Thirty-first Day of August, 2004

JON W. DUDAS
*Director of the United States Patent and Trademark Office*